United States Patent
Jeong et al.

(10) Patent No.: US 9,591,566 B2
(45) Date of Patent: Mar. 7, 2017

(54) CHANNEL ACCESS METHOD IN WIRELESS LAN SYSTEM

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/422,309

(22) PCT Filed: Jul. 25, 2013

(86) PCT No.: PCT/KR2013/006671
§ 371 (c)(1),
(2) Date: Feb. 18, 2015

(87) PCT Pub. No.: WO2014/027765
PCT Pub. Date: Feb. 20, 2014

(65) Prior Publication Data
US 2015/0230170 A1    Aug. 13, 2015

(30) Foreign Application Priority Data

Aug. 16, 2012 (KR) .................. 10-2012-0089531
Jun. 3, 2013 (KR) .................. 10-2013-0063670

(51) Int. Cl.
*H04W 52/02* (2009.01)
*H04W 74/04* (2009.01)
*H04W 56/00* (2009.01)
H04L 5/00 (2006.01)
H04W 74/06 (2009.01)
H04W 84/12 (2009.01)

(52) U.S. Cl.
CPC ..... *H04W 52/0209* (2013.01); *H04W 56/004* (2013.01); *H04W 74/04* (2013.01); *H04L 5/0053* (2013.01); *H04L 5/0055* (2013.01); *H04W 74/06* (2013.01); *H04W 84/12* (2013.01); *Y02B 60/50* (2013.01)

(58) Field of Classification Search
CPC ............. H04W 52/0209; H04W 74/04; H04W 56/004; H04W 74/06; H04W 84/12; Y02B 60/50; H04L 5/0055; H04L 5/0053
See application file for complete search history.

(56) References Cited

U.S. PATENT DOCUMENTS 8,121,108 B2    2/2012 Kwon et al.
8,675,575 B2 *  3/2014 Gong .................... H04L 1/1685
                                                370/310

(Continued)

FOREIGN PATENT DOCUMENTS

KR    10-2010-0058923 A    6/2010

*Primary Examiner* — Habte Mered
(74) *Attorney, Agent, or Firm* — Sughrue Mion, PLLC (57) ABSTRACT

A channel access method in a wireless LAN system is disclosed. The channel access method for a terminal comprises the steps of: receiving a beacon transmitted from an access point; determining a channel access slot of a terminal allocated on the basis of the beacon; transmitting a data transmission request from the channel access slot to the access point; and receiving data transmission slot allocation information corresponding to the data transmission request from the access point. Thus, the present invention can reduce power consumption of the terminal.

11 Claims, 10 Drawing Sheets

(56) References Cited

U.S. PATENT DOCUMENTS

| | | | |
|---|---|---|---|
| 2002/0089927 A1* | 7/2002 | Fischer | H04L 1/08 370/229 |
| 2004/0165563 A1 | 8/2004 | Hsu et al. | |
| 2004/0264428 A1 | 12/2004 | Choi et al. | |
| 2005/0047386 A1 | 3/2005 | Yi | |
| 2007/0268867 A1* | 11/2007 | Wentink | H04W 74/06 370/331 |
| 2007/0280156 A1 | 12/2007 | Kwon et al. | |
| 2010/0260114 A1 | 10/2010 | Vermani et al. | |
| 2013/0051293 A1* | 2/2013 | Wentink | H04W 52/0216 370/311 |
| 2013/0272137 A1* | 10/2013 | Kwon | H04W 72/042 370/241 |
| 2015/0071144 A1* | 3/2015 | Wentink | H04W 52/0216 370/311 |

* cited by examiner

CHANNEL ACCESS METHOD IN WIRELESS LAN SYSTEM

TECHNICAL FIELD

The present invention relates to a channel access method, and more particularly, to a channel access method between an access point (AP) and a terminal in a wireless local area network (WLAN) system.

BACKGROUND ART

With the development of information and communications technology, various wireless communication technologies are under development. Among these wireless communication technologies, a WLAN enables wireless connection to the Internet at a home or business or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. IEEE 802.11a provides a transmission speed of 54 Mbps using an unlicensed band at 5 GHz. IEEE 802.11b provides a transmission speed of 11 Mbps using direct sequence spread spectrum (DSSS) at 2.4 GHz. IEEE 802.11g provides a transmission speed of 54 Mbps using orthogonal frequency division multiplexing (OFDM) at 2.4 GHz. IEEE 802.11n provides a transmission speed of 300 Mbps for two spatial streams using multiple-input multiple-output (MIMO)-OFDM. IEEE 802.11n supports a channel bandwidth up to 40 MHz, and thus provides a transmission speed of 600 Mbps.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a 5 GHz or lower band, and IEEE 802.11ad is being developed as a standard for providing VHT in a 60 GHz band.

In a system based on such a WLAN technology, a terminal operating in a power saving mode (PSM) transmits a power save (PS)-poll frame to the corresponding AP to receive data buffered in the AP. At this time, if a plurality of terminals simultaneously transmit PS-poll frames, channel access competition occurs among the terminals, and a collision occurs among the PS-poll frames. Therefore, the terminals need to maintain an awake state or repeatedly perform retransmission of a PS-poll frame which is not transmitted due to the collision until data is successfully received from the AP, and thus a large amount of power is consumed.

DISCLOSURE

Technical Problem

The present invention is directed to providing a channel access method of a terminal for accessing a channel based on scheduling information.

The present invention is also directed to providing a channel access method of an access point (AP) for accessing a channel based on scheduling information.

Technical Solution

One aspect of the present invention provides a channel access method of a terminal, the method including: receiving a beacon transmitted by an access point (AP); determining an allocated channel access slot of the terminal based on the beacon; transmitting a data transmission request to the AP through the channel access slot; and receiving allocation information of a data transmission slot corresponding to the data transmission request from the AP.

Here, the terminal may determine the channel access slot of the terminal with reference to information included in the beacon to indicate the channel access slot of the terminal.

Here, the terminal may determine the channel access slot of the terminal based on an association identifier (AID) sequence of the terminal in delivery traffic indication map (DTIM) information included in the beacon.

Here, the data transmission request may be a power save (PS)-poll frame.

Here, the channel access slot may have a length corresponding to a sum of a PS-poll frame transmission time, a short interframe space (SIFS), and an acknowledgement (ACK) reception time.

Here, the data transmission slot allocation information may be included and received in an ACK frame corresponding to the data transmission request.

Here, the data transmission slot allocation information may be received using a null data packet (NDP) frame.

Here, the data transmission slot allocation information may be received using a predetermined bit of a signal (SIG) field in the NDP frame.

Here, the channel access method may further include receiving data corresponding to the data transmission request from the AP through the data transmission slot.

Another aspect of the present invention provides an operating method of an AP, the method including: transmitting a beacon; receiving a data transmission request from a terminal through a channel access slot allocated to the terminal based on the beacon; and transmitting information on a data transmission slot allocated to the terminal in response to the data transmission request to the terminal.

Here, the AP may allocate the channel access slot to the terminal using information included in the beacon to indicate the channel access slot of the terminal.

Here, the AP may allocate the channel access slot of the terminal based on an AID sequence of the terminal in DTIM information included in the beacon.

Here, the data transmission request may be a PS-poll frame.

Here, the channel access slot may have a length corresponding to a sum of a PS-poll frame transmission time, an SIFS, and an ACK reception time.

Here, the data transmission slot allocation information may be included and transmitted in an ACK frame corresponding to the data transmission request.

Here, the data transmission slot allocation information may be transmitted using an NDP frame.

Here, the data transmission slot allocation information may be transmitted using a predetermined bit of an SIG field in the NDP frame.

Here, the operating method may further include transmitting data corresponding to the data transmission request to the terminal through the data transmission slot.

Advantageous Effects

According to the present invention, by scheduling a channel access time point, it is possible to prevent channel access competition among terminals and a collision among power save (PS)-poll frames. Therefore, it is possible to prevent a terminal from unnecessarily consuming power due to channel access competition and from unnecessarily using a channel for retransmission of a PS-poll frame.

Also, since a terminal can enter a power saving mode (PSM) between a time point at which a response (i.e., acknowledgement (ACK)) to a PS-poll frame is received and a time point at which data is transmitted, power consumption can be reduced.

MODES OF THE INVENTION

While the present invention is susceptible to various modifications and alternative forms, specific embodiments are shown by way of example in the drawings and described in detail.

It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Throughout this specification, a station (STA) denotes an arbitrary functional medium including a physical layer interface for medium access control (MAC) and a wireless medium conforming to regulations of an Institute of Electrical and Electronics Engineers (IEEE) 802.11 standard. STAs can be classified as STAs that are access points (APs) and STAs that are non-APs. A STA that is an AP can be simply called an AP, and a STA that is a non-AP can be simply called a terminal.

A STA includes a processor and a transceiver, and can further include a user interface, a display device, and so on. The processor is a unit devised to generate a frame to be transmitted through a wireless network or to process a frame received through the wireless network, and performs various functions to control STAs. The transceiver is functionally connected to the processor and is a unit devised to transmit and receive frames for the STAs via the wireless network.

An AP can be referred to as a centralized controller, a base station (BS), a node-B, an evolved node-B (eNode-B), a base transceiver system (BTS), a site controller, etc., and can include all or some of the functions thereof.

A terminal may be referred to as a wireless transmit/ receive unit (WTRU), user equipment (UE), a user terminal (UT), an access terminal (AT), a mobile station (MS), a mobile terminal, a subscriber unit, a subscriber station (SS), a wireless device, a mobile subscriber unit, etc., and can include all or some of the functions thereof.

Here, a desktop computer, a laptop computer, a tablet personal computer (PC), a wireless phone, a mobile phone, a smartphone, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, etc. capable of communication can be used as the terminal.

Figure 1:
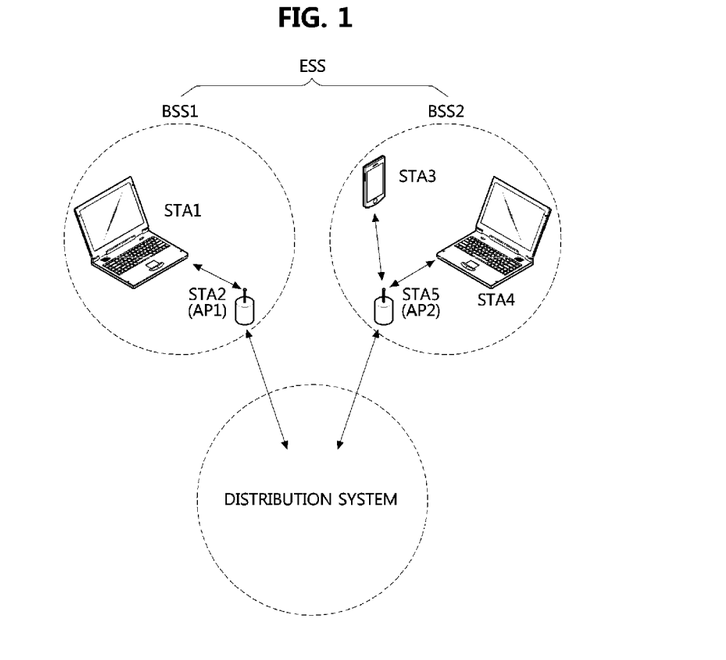
FIG. 1 is a conceptual diagram illustrating an embodiment of a constitution of an Institute of Electrical and Electronics Engineers (IEEE) 802.11 wireless local area network (WLAN) system.

FIG. 1 is a conceptual diagram illustrating an embodiment of a constitution of an IEEE 802.11 wireless local area network (WLAN) system.

Referring to FIG. 1, an IEEE 802.11 WLAN system includes at least one basic service set (BSS). The BSS denotes a set of STAs STA 1, STA 2 (AP 1), STA 3, STA 4, and STA 5 (AP 2) capable of communicating with each other through successful synchronization, and is not a concept that denotes a specific area.

BSSs can be classified as infrastructure BSSs and independent BSSs (IBSSs), and BSS 1 and BSS 2 are infrastructure BSSs. BSS 1 can include the terminal STA 1, the AP STA 2 (AP 1) that provides a distribution service, and a distribution system (DS) that connects the plurality of APs STA 2 (AP 1) and STA 5 (AP 2). In BSS 1, the AP STA 2 (AP 1) manages the terminal STA 1.

BSS 2 can include the terminals STA 3 and STA 4, the AP STA 5 (AP 2) that provides the distribution service, and the DS that connects the plurality of APs STA 2 (AP 1) and STA 5 (AP 2). In BSS 2, the AP STA 5 (AP 2) manages the terminals STA 3 and STA 4.

Meanwhile, an IBSS is a BSS operating in an ad-hoc mode. Since an IBSS does not include any AP, there is no centralized management entity. In other words, in an IBSS, terminals are managed in a distributed manner. In an IBSS, all terminals can be mobile terminals and are not allowed to connect to a DS, thus constituting a self-contained network.

The access points STA 2 (AP 1) and STA 5 (AP 2) provide access to the DS through a wireless medium for the terminals STA 1, STA 3, and STA 4 connected thereto. Communication between the terminals STA 1, STA 3, and STA 4 in BSS 1 or BSS 2 is generally performed through the APs STA 2 (AP 1) and STA 5 (AP 2), but when a direct link is established, direct communication between the terminals STA 1, STA 3, and STA 4 is possible.

A plurality of infrastructure BSSs may be interconnected via a DS. A plurality of BSSs connected through a DS is referred to as an extended service set (ESS). Stations included in an ESS may communicate with each other, and a terminal in the ESS may move from one BSS to another BSS while performing seamless communication.

A DS is a mechanism for one AP to communicate with another AP, in which the AP can transmit a frame for terminals connected to a BSS managed by the AP or can transmit a frame for an arbitrary terminal which has moved to another BSS. Also, the AP can exchange frames with an external network, such as a wired network. Such a DS is not necessarily a network, and can have any form for providing a predetermined distribution service defined in an IEEE 802.11 standard. For example, a DS may be a wireless network, such as a mesh network, or a physical structure that connects APs with each other.

A channel access method according to an embodiment of the present invention to be described below can be applied to the IEEE 802.11 WLAN system described above, and can be applied to various networks, such as a wireless personal area network (WPAN) and a wireless body area network (WBAN), as well as the IEEE 802.11 WLAN system.

Figure 2:
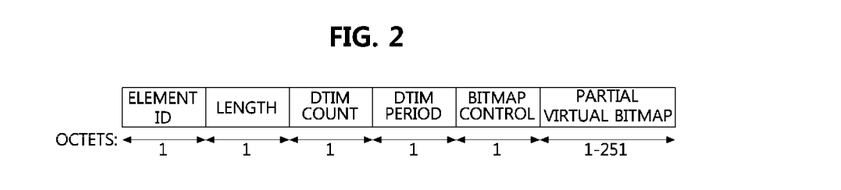
FIG. 2 is a block diagram showing an embodiment of components of a traffic indication map (TIM) included in a beacon.

FIG. 2 is a block diagram showing an embodiment of components of a traffic indication map (TIM) included in a beacon.

In an IEEE 802.11 WLAN system, when there is data to be transmitted to a terminal in a power saving state (doze state), an AP notifies the terminal that there is data to be transmitted using a TIM in a periodically transmitted beacon frame.

Referring to FIG. 2, a TIM includes an element identifier (ID) field, a length field, a delivery traffic indication message (DTIM) count field, a DTIM period field, a bitmap control field, and a partial virtual bitmap field.

The length field represents the length of an information field. The DTIM count field represents the number of beacons appearing before a DTIM appears. A DTIM count of zero indicates that a current TIM corresponds to a DTIM. The DTIM count field consists of one octet. The DTIM period field represents the number of beacon intervals between consecutive DTIMs. When all TIMs are DTIMs, a value of the DTIM period field is one. The DTIM period field consists of one octet.

The bitmap control field consists of one octet, and bit number 0 in the bitmap control field represents a traffic indicator bit associated with association ID (AID) 0. When this bit is set to 1 and the value of the DTIM count field is 0, at least one multicast or broadcast frame has been buffered in the AP. The other seven bits in the bitmap control field form a bitmap offset.

The partial virtual bitmap field consists of 1 to 251 octets, and bit number N has a value between 0 and 2007. Each bit of the partial virtual bitmap field corresponds to traffic buffered for a specific terminal. When the AID of an arbitrary terminal is N, if there is no traffic buffered for the arbitrary terminal, bit number N of the partial virtual bitmap field is set to 0. If there is traffic buffered for the arbitrary terminal, bit number N of the partial virtual bitmap field is set to 1.

Figure 3:
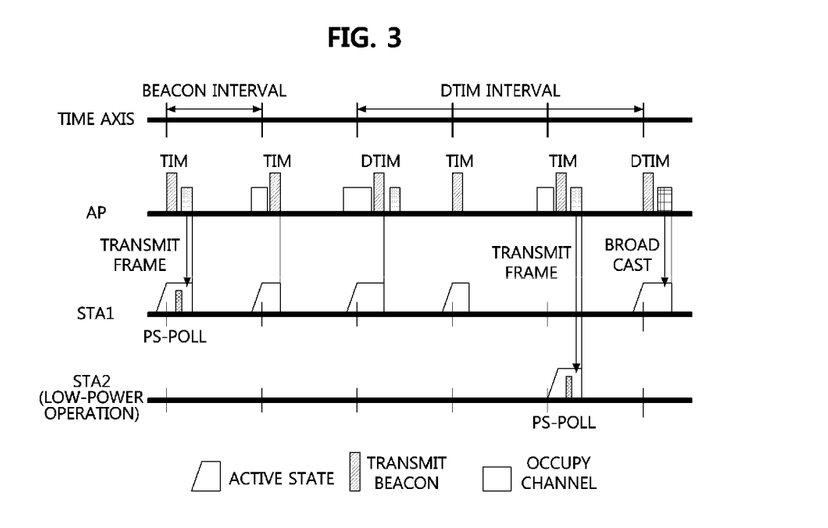
FIG. 3 is a conceptual diagram illustrating an embodiment of a data transmission process of an access point (AP).

FIG. 3 is a conceptual diagram illustrating an embodiment of a data transmission process of an AP.

Referring to FIG. 3, an AP periodically broadcasts a beacon, and can broadcast a beacon including a DTIM at three beacon intervals. Terminals STA 1 and STA 2 supporting a power save mode (PSM) periodically awaken to receive the beacon, and check a TIM or the DTIM included in the beacon to determine whether data to be transmitted to the terminals STA 1 and STA 2 has been buffered in the AP. At this time, if there is buffered data, the terminals STA 1 and STA 2 maintain an awake state to receive the data from the AP. If there is no buffered data, the terminals STA 1 and STA 2 return to a power saving state (i.e., doze state).

In other words, when a bit in the TIM corresponding to the AID of the terminal STA 1 or STA 2 is set to 1, the terminal STA 1 or STA 2 transmits a PS-poll frame (or trigger frame) indicating that the terminal STA 1 or STA 2 is awake and ready to receive data to the AP, and the AP can check that the terminal STA 1 or STA 2 is ready to receive data by receiving the PS-poll frame and transmit data or an ACK to the terminal STA 1 or STA 2. If the AP has transmitted the ACK to the terminal STA 1 or STA 2, the AP transmits data to the terminal STA 1 or STA 2 at an appropriate time point. On the other hand, when a bit in the TIM corresponding to the AID of the terminal STA 1 or STA 2 is set to 0, the terminal STA 1 or STA 2 returns to the power saving state.

In the TIM (or DTIM) included in the beacon, bits can be simultaneously set for a plurality of terminal AIDs. Therefore, after the AP broadcasts the beacon, the plurality of terminals simultaneously transmit PS-polls to the AP if bits corresponding to the AIDs of the terminals are set to 1. At this time, wireless channel access competition for transmitting a PS-poll frame is severe among the plurality of terminals, and a collision occurs among the terminals due to a hidden node problem, which is a chronic problem of a WLAN system.

For example, such a phenomenon may frequently occur in a WLAN service that supports thousands of low-power sensor terminals. In this case, the terminals need to maintain the awake state to complete reception of data or repeatedly perform retransmission of PS-poll frames which have not been transmitted due to a collision, which may result in a serious power consumption problem.

Figure 4:
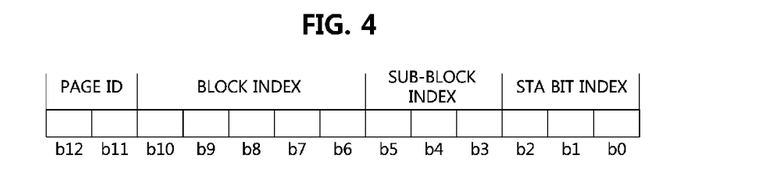
FIG. 4 is a block diagram showing an embodiment of an association identifier (AID) structure.
Figure 5:
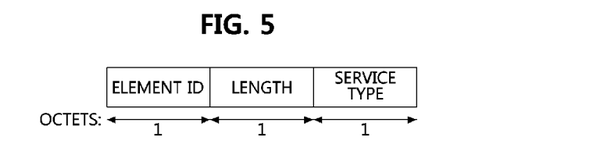
FIG. 5 is a block diagram showing a frame structure for indicating a service type of a terminal.

FIG. 4 is a block diagram showing an embodiment of an AID structure, and FIG. 5 is a block diagram showing a frame structure for indicating a service type of a terminal.

When there are a large number of terminals provided with service through one AP and the terminals can be grouped according to similar characteristics, the AP can group and manage the AIDs of the terminals.

Referring to FIG. 4, an AID structure includes a page ID field, a block index field, a sub-block index field, and a STA bit index field. In other words, AIDs can be managed according to groups stratified in page/block/sub-block units.

Referring to FIG. 5, a terminal can indicate a service type in an association request frame and transmit the association request frame to an AP. Service types can include a low-power terminal type, a terminal type having channel access priority, a general terminal type, and so on.

In other words, a terminal can transmit an association request frame in which a service type is indicated to the AP, and the AP can designate a group as a page/block/sub-block suited for the service type and allocate an AID according to the designated group.

Figure 6:
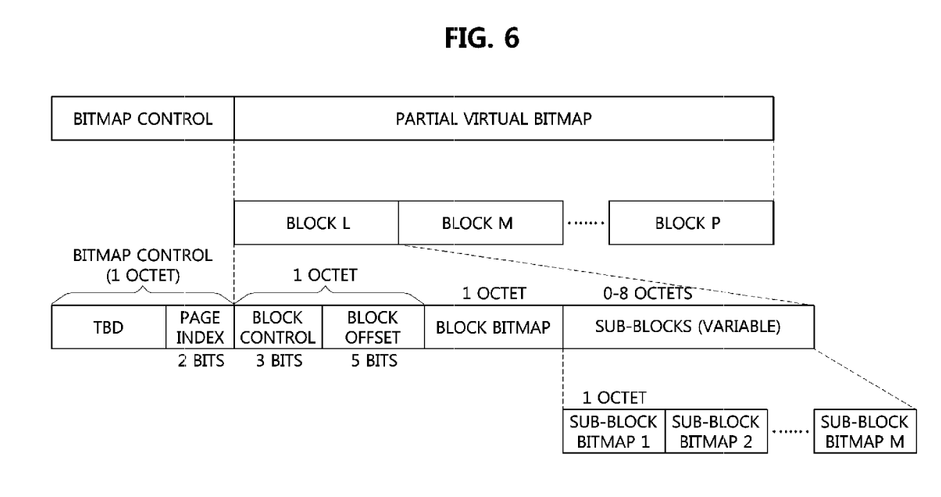
FIG. 6 is a conceptual diagram of an embodiment of a structure of a TIM encoded in block units.

FIG. 6 is a conceptual diagram of an embodiment of a structure of a TIM encoded in block units.

Referring to FIG. 6, a partial virtual bitmap field includes at least one block (block L, block M, . . . , and block P) field. One block field includes a block control field, a block offset field, a block bitmap field, and a sub-block field having a variable size. The sub-block field includes at least one sub-block bitmap (sub-block bitmap 1, sub-block bitmap 2, . . . , and sub-block bitmap M) field.

The block control field represents the encoding mode (i.e., a block bitmap mode, a single AID mode, an offset+length+ bitmap (OLB) mode, or an inverse mode) of the TIM. The block offset field represents the offset value of an encoded block. The block bitmap field represents a bitmap indicating sub-blocks in which AID bits have been set among sub-blocks in the block indicated by the block offset. The sub-block field represents a bitmap of AIDs in the sub-blocks.

Figure 7:
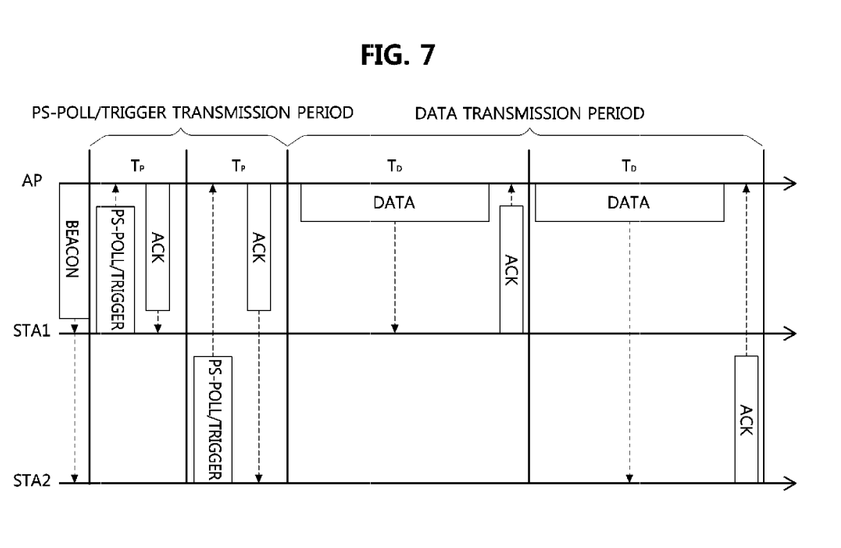
FIG. 7 is a conceptual diagram illustrating an embodiment of channel access scheduling through slot allocation.

FIG. 7 is a conceptual diagram illustrating an embodiment of channel access scheduling through slot allocation.

Referring to FIG. 7, a process in which terminals STA 1 and STA 2 receive data from an AP AP includes 1) an operation of transmitting PS-poll (or trigger) frames to the AP AP after receiving a beacon, and receiving responses (i.e., ACKs) to the transmission of the PS-poll (or trigger) frames from the AP AP, and 2) an operation of receiving data from the AP and transmitting responses (i.e., ACKs) to the reception of the data to the AP AP.

In a PS-poll/trigger transmission period, the AP AP can allocate time slots to the respective terminals STA 1 and STA 2 at time intervals of $T_P$. $T_P$ is a time in which it is possible to transmit one PS-poll (or trigger) frame, and the AP AP can set $T_P$ in consideration of "PS-poll (or trigger) frame transmission time+short interframe space (SIFS)+ACK reception time." During the PS-poll/trigger transmission period, it is possible to limit channel access attempts of terminals other than the terminals STA 1 and STA 2 set in information (i.e., bitmap) in a DTIM (or TIM).

During a data transmission period, the AP can allocate time slots to the respective terminals STA 1 and STA 2 at time intervals of $T_D$. The AP AP can set $T_D$ in consideration of "data reception time+SIFS+ACK reception time," that is, a time in which it is possible to transmit one piece of maximum data. The AP AP can limit the size of data transmitted to one terminal STA 1 or STA 2 to be transmitted in one $T_D$ period, or can allow the size of data to be transmitted in a plurality of $T_D$ periods.

The length of the PS-poll/trigger transmission period and the length of the data transmission period can be variable according to the number of transmission-target terminals and the amount of data set in the DTIM (or TIM) information (i.e., bitmap) included in the beacon.

Figure 8:
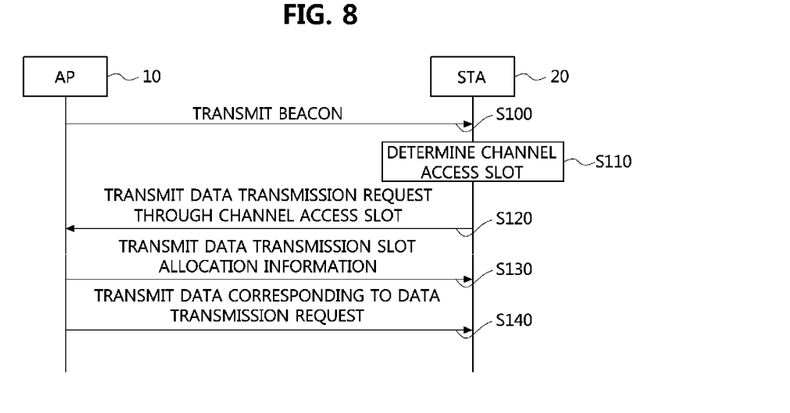
FIG. 8 is a sequence diagram illustrating a channel access method according to an embodiment of the present invention.

FIG. 8 is a sequence diagram illustrating a channel access method according to an embodiment of the present invention.

Referring to FIG. 8, according to a channel access method in the aspect of an AP 10, the AP 10 can transmit a beacon to a terminal 20 (S100), receive a data transmission request from the terminal 20 through a channel access slot allocated to the terminal 20 based on the beacon (S120), transmit information on a data transmission slot allocated to the terminal 20 in response to the data transmission request to the terminal 20 (S130), and transmit data corresponding to the data transmission request to the terminal 20 through the data transmission slot (S140).

According to the channel access method in the aspect of the terminal 20, the terminal 20 can receive the beacon transmitted by the AP 10 (S100), determine its allocated channel access slot based on the beacon (S110), transmit the data transmission request to the AP 10 through its channel access slot (S120), receive the data transmission slot allocation information corresponding to the data transmission request from the AP 10 (S130), and receive the data corresponding to the data transmission request from the AP 10 through the data transmission slot (S140).

In operation S100, the AP 10 can include predetermined allocation rules of channel access slots $T_P$ (see FIGS. 16 to 18) in a beacon and transmit the beacon in a broadcasting scheme. The channel access slot allocation rules include 1) a rule for allocating a channel access slot based on channel access slot allocation information additionally included in the beacon (referred to as "channel access slot allocation rule 1" below), and 2) a rule for allocating a channel access slot according to an AID sequence in DTIM (or TIM) information (i.e., bitmap) included in the beacon (referred to as "channel access slot allocation rule 2" below).

A channel access slot can have a length corresponding to "data transmission request frame (i.e., PS-poll/trigger frame) transmission time+SIFS+ACK reception time," "data transmission request frame (i.e., PS-poll/trigger frame) transmission time+SIFS+null data packet (NDP) frame reception time," or "data transmission request frame (i.e., PS-poll/trigger frame) transmission time+SIFS+ACK reception time+SIFT+NDP frame reception time." An NDP frame will be described in detail below.

When the predetermined rule is "channel access slot allocation rule 1," the AP 10 can additionally include information on channel access slots allocated to respective terminals 20 in the beacon, and transmit the beacon including the channel access slot information to the terminals 20 in the broadcasting scheme. The channel access slot information can include channel access slot allocation information that indicates slots using time information (e.g., start times, end times, durations, and so on) of the respective slots. Alternatively, the channel access slot information can include channel access slot allocation information that indicates sequence information (indices) of slots for respective terminals together with time information that is in common to the respective slots (e.g., a start time and an end time of a channel access period, and a duration of the respective slots). Here, the time information denotes absolute time information (e.g., a time synchronization function (TSF) value) or relative time information (e.g., a relative offset value of a TSF).

When the predetermined rule is "channel access slot allocation rule 2," the AP 10 can transmit the beacon which does not additionally include channel access slot allocation information to the terminals 20 in the broadcasting scheme.

The AP 10 can allocate one channel access slot to one terminal 20 or a plurality of terminals 20. Also, when the AIDs of terminals are grouped and managed, the AP 10 can allocate one channel access slot to one group, and one group can be a page unit, a block unit, or a sub-block unit.

In operation S110, the terminal 20 can determine a channel access slot allocated to the terminal 20 based on the beacon received from the AP 10. When the predetermined rule is "channel access slot allocation rule 1," the terminal 20 can determine the channel access slot allocated to the terminal 20 based on channel access slot allocation information included in the beacon. In other words, the terminal 20 can determine the channel access slot allocated to the terminal 20 based on time information (e.g., start times, end times, durations, and so on) of respective slots or sequence information of the slots included in channel access slot information.

When the predetermined rule is "channel access slot allocation rule 2," the terminal 20 can determine the channel access slot allocated to the terminal 20 based on an AID sequence in DTIM (or TIM) information (i.e., bitmap) included in the beacon.

Figure 9:
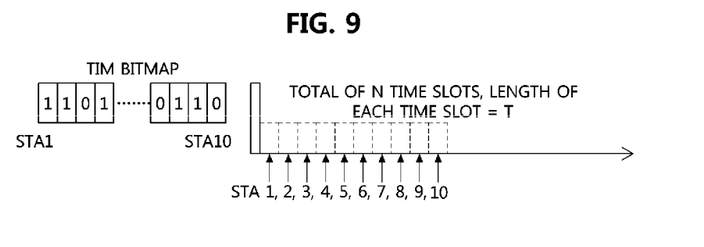
FIG. 9 is a conceptual diagram illustrating an embodiment of a method of allocating channel access slots.

FIG. 9 is a conceptual diagram illustrating an embodiment of a method of allocating channel access slots.

Referring to FIG. 9, AIDs can be set in DTIM (or TIM) information (i.e., bitmap) in order of terminal 1 STA 1 to terminal 10 STA 10, and channel access slots can be allocated in the same order. Therefore, the terminal 20 can determine the channel access slot allocated to the terminal 20 according to the DTIM (or TIM) information (i.e., bitmap) included in the beacon. For example, when the AID sequence of terminal 1 STA 1 is the first in the DTIM (or TIM) bitmap, a first slot in a PS-poll/trigger transmission period can be allocated as a channel access slot for terminal 1 STA 1.

Here, the start time point, the end time point, and the duration of the channel access slot can be defined in advance between the AP 10 and the terminal 20, or can be included in the beacon and transmitted by the AP 10. Therefore, the terminal 20 can determine the channel access slot allocated to the terminal 20 in consideration of the AID sequence in the DTIM (or TIM) information (i.e., bitmap) included in the beacon, the start time point, the end time point, and the duration of the channel access slot, and so on. For example, the terminal 20 can determine the channel access slot allocated to the terminal 20 in consideration of the AID sequence in the bitmap and the start time point and the end time point of the channel access slot, determine the channel access slot allocated to the terminal 20 in consideration of the AID sequence in the bitmap and the start time point and the duration of the channel access slot, or determine the channel access slot allocated to the terminal 20 in consideration of the AID sequence in the bitmap and the end time point and the duration of the channel access slot.

In operation S120, the terminal 20 can transmit a data transmission request to the AP 10 through the channel access slot allocated to the terminal 20. Here, the data transmission request can be a PS-poll frame or a trigger frame. In other words, as the data transmission request, the terminal 20 can transmit the PS-poll (or trigger) frame to the AP 10 through the channel access slot allocated to the terminal 20.

Figure 10:
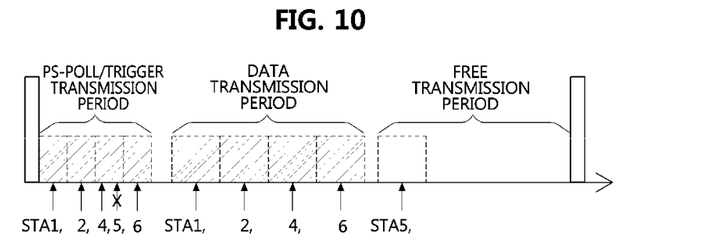
FIG. 10 is a conceptual diagram illustrating an embodiment of a method of transmitting a data transmission request.
Figure 11:
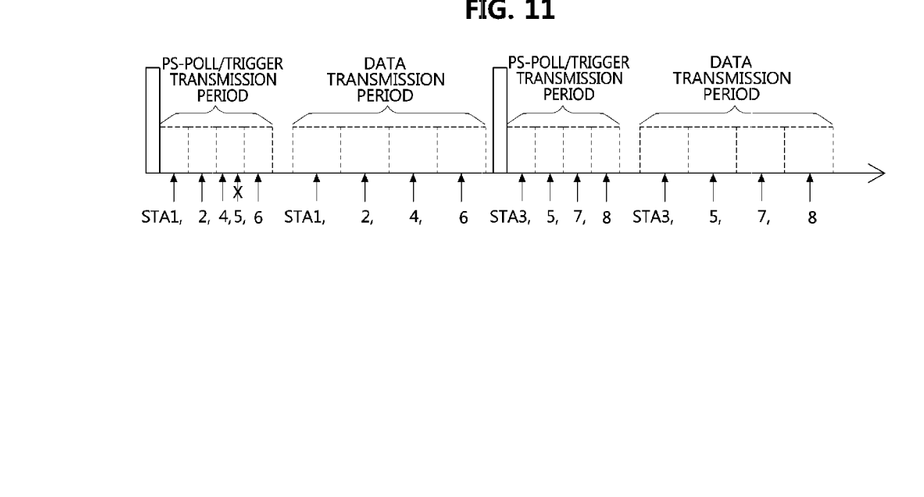
FIG. 11 is a conceptual diagram illustrating another embodiment of a method of transmitting a data transmission request.

FIG. 10 is a conceptual diagram illustrating an embodiment of a method of transmitting a data transmission request, and FIG. 11 is a conceptual diagram illustrating another embodiment of a method of transmitting a data transmission request.

Referring to FIGS. 10 and 11, terminal 4 STA 4 and terminal 5 STA 5 are allocated to one channel access slot, and channel access competition causes terminal 4 STA 4 to successfully transmit a data transmission request (i.e., PS-poll (or trigger) frame) through the allocated channel access slot and terminal 5 STA 5 to fail to transmit a data transmission request.

At this time, if there is a free transmission period (i.e., a period that has not been allocated as a PS-poll/trigger transmission period or a data transmission period) in a beacon interval as shown in FIG. 10, terminal 5 STA 5 can receive data from an AP AP in an existing data transmission scheme (e.g., PS-poll transmission→data reception). Here, the free transmission period can be set so that only terminals not allocated data transmission slots among terminals allocated channel access slots can participate in channel access competition and receive data.

On the other hand, when there is no free transmission period in a beacon interval as shown in FIG. 11, terminal 5 STA 5 can transmit a PS-poll (or trigger) frame to the AP AP during a PS-poll/trigger transmission period of the next beacon period, and receive data from the AP AP due to the transmission of the PS-poll (or trigger) frame.

Figure 16:
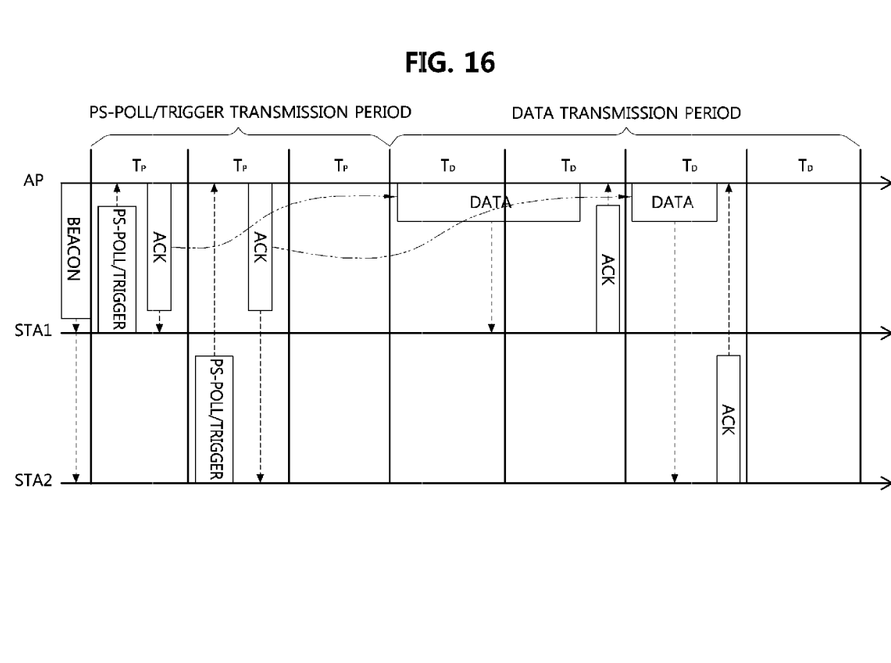
FIG. 16 is a conceptual diagram illustrating an embodiment of a method of allocating data transmission slots based on information included in an acknowledgement (ACK).
Figure 17:
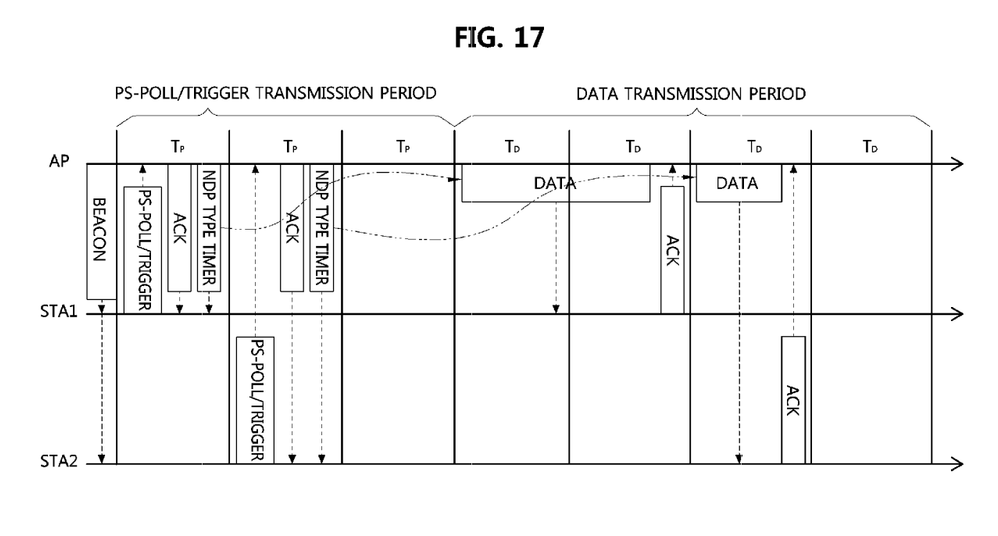
FIG. 17 is a conceptual diagram illustrating an embodiment of a method of allocating data transmission slots based on information included in an NDP frame.
Figure 18:
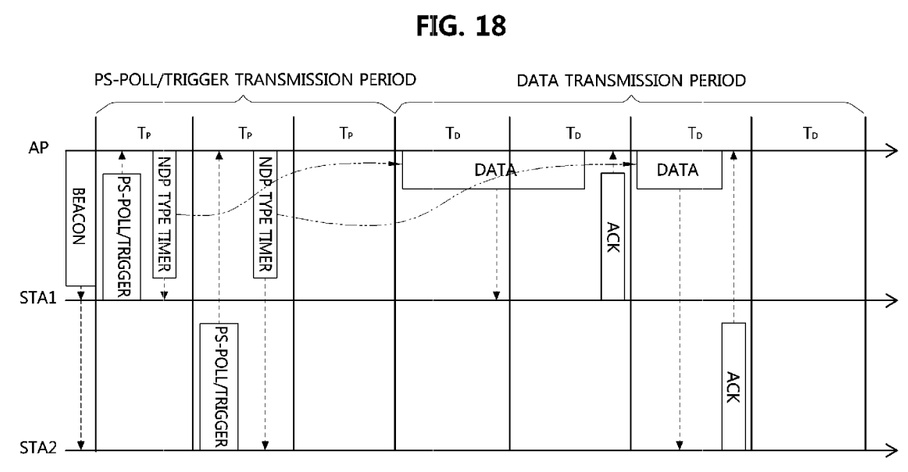
FIG. 18 is a conceptual diagram illustrating an embodiment of a method of allocating data transmission slots based on information included in an NDP frame replacing an ACK.

In operation S130, the AP 10 can transmit data transmission slot allocation information to the terminal 20 based on predetermined allocation rules of data transmission slots $T_D$ (see FIGS. 16 to 18). The data transmission slot allocation rules include 1) a rule for allocating a data transmission slot according to the channel access slot allocation sequence (referred to as "data transmission slot allocation rule 1" below), 2) a rule for allocating a data transmission slot based on data transmission slot allocation information included in a response (e.g., ACK) to the data transmission request (referred to as "data transmission slot allocation rule 2" below), and 3) a rule for allocating a data transmission slot based on data transmission slot allocation information included in a frame separate from the response (e.g., ACK) to the data transmission request (referred to as "data transmission slot allocation rule 3" below).

A data transmission slot can have a length corresponding to "data reception time+SIFS+ACK reception time." Data transmission slot allocation information can include at least one type of information between time information (start times, end times, durations, etc.) of slots and sequence information (indices) of the slots. The time information denotes absolute time information (e.g., a TSF value) or relative time information (e.g., a relative offset value of a TSF)

When the predetermined rule is "data transmission slot allocation rule 1," the AP 10 can transmit a frame (i.e., ACK that is a response to the data transmission request) including no data transmission slot allocation information.

When the predetermined rule is "data transmission slot allocation rule 2," the AP 10 can generate an ACK including data transmission slot allocation information and transmit the generated ACK to the terminal 20.

When the predetermined rule is "data transmission slot allocation rule 3," the AP 10 can generate an additional frame including data transmission slot allocation information and transmit the generated frame to the terminal 20. As the frame including data transmission slot allocation information, an NDP frame can be used.

After transmitting an ACK which is a response to the data transmission request to the terminal 20, the AP 10 can transmit an NDP frame to the terminal 20. In this case, the channel access slot can have a length corresponding to "PS-poll frame transmission time+SIFS+ACK reception time+SIFS+NDP frame reception time." Meanwhile, the AP 10 can transmit an NDP frame instead of an ACK which is a response to the data transmission request to the terminal 20. In this case, the channel access slot can have a length corresponding to "PS-poll frame transmission time+SIFS+NDP frame reception time."

Figure 12:
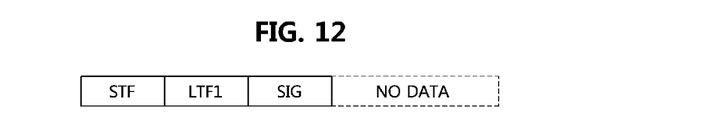
FIG. 12 is a block diagram showing an embodiment of a structure of a null data packet (NDP) frame.
Figure 13:
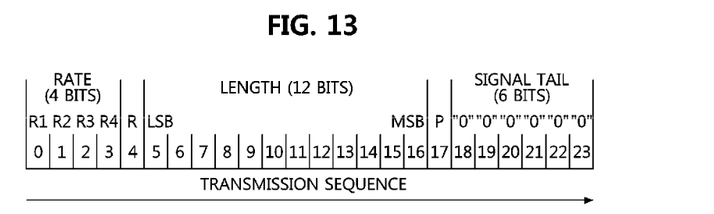
FIG. 13 is a block diagram showing an embodiment of an SIG structure in an NDP frame.

FIG. 12 is a block diagram showing an embodiment of a structure of an NDP frame, and FIG. 13 is a block diagram of an embodiment of a signal (SIG) structure in an NDP frame.

Referring to FIG. 12, an NDP frame includes a short training field (STF), a long training field (LTF1), and an SIG, but does not include a data field. In other words, an NDP frame can be configured as a very short frame that transmits only a physical layer (PHY) preamble, thus occupying a very small wireless channel. Data transmission slot allocation information can be represented using bits present in the SIG of the NDP frame.

Referring to FIG. 13, an SIG in an NDP frame includes a rate field, a length field, and a signal tail field. The first four bits in the SIG relate to the rate field and represent a modulation type and a coding rate. A reserved rate field that is not used in the rate field in the SIG can be used to indicate a new SIG message type. Using bits other than the bits of the rate field, it is possible to represent a reception address, data transmission time information, and so on. The reception address can be the whole AID or a partial AID of a receiving terminal.

Meanwhile, when sequence information of data transmission slots is included in data transmission slot allocation information, an AP can include sequence information of a data transmission slot for a current terminal in an ACK (or NDP frame) and transmit the ACK (or NDP frame) to the current terminal, and thereafter or simultaneously, can update the sequence of a data transmission slot for a next terminal in advance in consideration of the slot sequence information transmitted to the current terminal and the number of slots required for data transmission of the current terminal.

In operation S140, the AP 10 can provide data corresponding to the data transmission request to the terminal 20 through the data transmission slot.

When the predetermined rule is "data transmission slot allocation rule 1," the AP 10 can allocate a data transmission slot according to the channel access slot allocation sequence, and transmit the data to the terminal 20 through the allocated data transmission slot. The terminal 20 can receive the data transmitted through the allocated data transmission slot.

Figure 14:
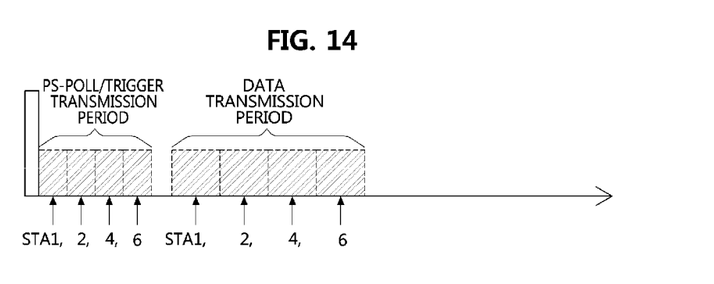
FIG. 14 is a conceptual diagram illustrating an embodiment of a method of allocating data transmission slots according to a sequence of channel access slots.
Figure 15:
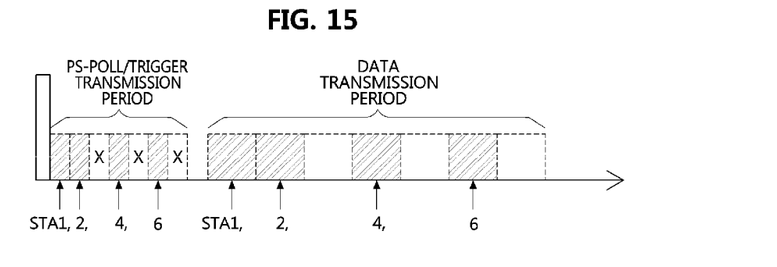
FIG. 15 is a conceptual diagram illustrating another embodiment of a method of allocating data transmission slots according to a sequence of channel access slots.

FIG. 14 is a conceptual diagram illustrating an embodiment of a method of allocating data transmission slots according to a sequence of channel access slots, and FIG. 15 is a conceptual diagram illustrating another embodiment of a method of allocating data transmission slots according to a sequence of channel access slots.

Referring to FIG. 14, channel access slots are allocated to terminal 1 STA 1, terminal 2 STA 2, terminal 4 STA 4, and terminal 6 STA 6 in sequence in a PS-poll/trigger frame transmission period, and data transmission slots are allocated to terminal 1 STA 1, terminal 2 STA 2, terminal 4 STA 4, and terminal 6 STA 6 in sequence according to the sequence of the channel access slots in a data transmission period. At this time, data to be transmitted to one terminal can be completely transmitted through one data transmission slot.

The terminals STA 1, STA 2, STA 4, and STA 6 can have time information (e.g., start times, end times, durations, etc. of slots) of the PS-poll/trigger transmission period, time information (e.g., start times, end times, durations, etc. of slots) of the data transmission period, and sequence information of the channel access slots allocated to the terminals STA 1, STA 2, STA 4, and STA 6. The terminals STA 1, STA 2, STA 4, and STA 6 can determine the data transmission slots through which data to be transmitted to the terminals STA 1, STA 2, STA 4, and STA 6 is delivered based on the information, and receive the data through the determined data transmission slots.

Referring to FIG. 15, when terminals do not transmit PS-poll (or trigger) frames even if channel access slots have been allocated in a PS-poll/trigger transmission period, data transmission slots in a data transmission period may not be used. In this case, when no frame is transmitted during a predetermined time (e.g., SIFS) after a data transmission slot starts, it is possible to prevent the data transmission slot from being wasted by allowing free competition among other terminals (at this time, an AP can broadcast a frame including information that free competition among terminals is allowed).

When the predetermined rule is "data transmission slot allocation rule 2," the AP 10 can allocate a data transmission slot based on the data transmission slot allocation information included in the ACK, and transmit the data to the terminal 20 through the allocated data transmission slot. The terminal 20 can receive the data transmitted through the data transmission slot allocated to the terminal 20.

FIG. 16 is a conceptual diagram illustrating an embodiment of a method of allocating data transmission slots based on information included in an ACK.

Referring to FIG. 16, when data transmission slot allocation information included in an ACK in a first channel access slot $T_P$ represents first and second data transmission slots $T_D$ in a data transmission period, an AP AP can transmit data to a terminal STA 1 through the first and second data transmission slots $T_D$, and the terminal STA 1 can receive the data transmitted through the first and second data transmission slots $T_D$.

Meanwhile, when data transmission slot allocation information included in an ACK in a second channel access slot $T_P$ represents a third data transmission slot $T_D$ in the data transmission period, the AP AP can transmit data to a terminal STA 2 through the third data transmission slot $T_D$, and the terminal STA 2 can receive the data transmitted through the third data transmission slot $T_D$.

When the predetermined rule is "data transmission slot allocation rule 3," the AP 10 can allocate a data transmission slot based on the data transmission slot allocation information included in the NDP frame, and transmit the data to the terminal 20 through the allocated data transmission slot. The terminal 20 can receive the data transmitted through the data transmission slot allocated to the terminal 20.

FIG. 17 is a conceptual diagram illustrating an embodiment of a method of allocating data transmission slots based on information included in an NDP frame.

Referring to FIG. 17, when data transmission slot allocation information included in an NDP frame (i.e., NDP type timer) in a first channel access slot $T_P$ represents first and second data transmission slots $T_D$ in a data transmission period, an AP AP can transmit data to a terminal STA 1 through the first and second data transmission slots $T_D$, and the terminal STA 1 can receive the data transmitted through the first and second data transmission slots $T_D$.

Meanwhile, when data transmission slot allocation information included in an NDP frame (i.e., NDP type timer) in a second channel access slot $T_P$ represents a third data transmission slot $T_D$ in the data transmission period, the AP AP can transmit data to a terminal STA 2 through the third data transmission slot $T_D$, and the terminal STA 2 can receive the data transmitted through the third data transmission slot $T_D$.

When the predetermined rule is "data transmission slot allocation rule 3," the AP 10 can allocate a data transmission slot based on the data transmission slot allocation information included in the NDP frame replacing the ACK, and transmit the data to the terminal 20 through the allocated data transmission slot. The terminal 20 can receive the data transmitted through the data transmission slot allocated to the terminal 20.

FIG. 18 is a conceptual diagram illustrating an embodiment of a method of allocating data transmission slots based on information included in an NDP frame replacing an ACK.

Referring to FIG. 18, when data transmission slot allocation information included in an NDP frame (i.e., NDP type timer) in a first channel access slot $T_P$ represents first and second data transmission slots $T_D$ in a data transmission period, an AP AP can transmit data to a terminal STA 1 through the first and second data transmission slots $T_D$, and the terminal STA 1 can receive the data transmitted through the first and second data transmission slots $T_D$.

Meanwhile, when data transmission slot allocation information included in an NDP frame (i.e., NDP type timer) in a second channel access slot $T_P$ represents a third data transmission slot $T_D$ in the data transmission period, the AP AP can transmit data to a terminal STA 2 through the third data transmission slot $T_D$, and the terminal STA 2 can receive the data transmitted through the third data transmission slot $T_D$.

While the invention has been shown and described with reference to certain exemplary embodiments thereof, it will be understood by those of ordinary skill in the art that various changes in form and details may be made therein without departing from the spirit and scope of the invention as defined by the appended claims.

The invention claimed is:

1. A method for channel access by a terminal, the method comprising:
    transmitting a Power Save (PS)-Poll frame or a trigger frame to an access point; and
    receiving, in response to the PS-Poll frame or the trigger frame, from the access point, a response frame including data transmission time information, wherein data transmission from the access point to the terminal is performed at a time indicated by the data transmission time information,
    wherein the response frame is a Null Data Packet (NDP) type frame including a Short Training Field (STF) field, a Long Training Field (LTF) field, and a Signal (SIG) field without a Data field, and the data transmission time information is included in the SIG field.

2. The method of claim 1, wherein the response frame is Acknowledgement (ACK) frame.

3. The method of claim 1, wherein the data transmission time information includes a value for Time Synchronization Function (TSF).

4. The method of claim 1, wherein the data transmission time information includes an offset time information relative to a start time of data transmission period.

5. The method of claim 1, wherein the terminal enters a power saving mode after receiving the response frame, and
    wherein the terminal wakes up at a time indicated by the data transmission time information.

6. A method by an access point for supporting channel access of a terminal, the method comprising:
    receiving a Power Save (PS)-Poll frame or a trigger frame from the terminal; and
    transmitting, in response to the PS-Poll frame or the trigger frame, to the terminal, a response frame including data transmission time information, wherein data transmission from the access point to the terminal is performed at a time indicated by the data transmission time information,
    wherein the response frame is a Null Data Packet (NDP) type frame including a Short Training Field (STF) field, a Long Training Field (LTF) field, and a Signal (SIG) field without a Data field, and the data transmission time information is included in the SIG field.

7. The method of claim 6, wherein the response frame is Acknowledgement (ACK) frame.

8. The method of claim 6, wherein the data transmission time information includes a value for Time Synchronization Function (TSF).

9. The method of claim 6, wherein the data transmission time information includes an offset time information relative to a start time of data transmission period.

10. A terminal for performing channel access, the terminal comprising:
    a transceiver; and
    a processor,
    wherein the processor is configured to:
        transmit, using the transceiver, a Power Save (PS)-Poll frame or a trigger frame to an access point; and
        receive, in response to the PS-Poll frame or the trigger frame, using the transceiver from the access point, a response frame including data transmission time information, wherein data transmission from the access point to the terminal is performed at a time indicated by the data transmission time information,
    wherein the response frame is a Null Data Packet (NDP) type frame including a Short Training Field (STF) field, a Long Training Field (LTF) field, and a Signal (SIG)

field without a Data field, and the data transmission time information is included in the SIG field.

11. An access point for supporting channel access of a terminal, the access point comprising:
a transceiver; and
a processor,
wherein the processor is configured to:
receive, using the transceiver, a Power Save (PS)-Poll frame or a trigger frame from the terminal; and
transmit, in response to the PS-Poll frame or the trigger frame, using the transceiver to the terminal, a response frame including data transmission time information, wherein data transmission from the access point to the terminal is performed at a time indicated by the data transmission time information,
wherein the response frame is a Null Data Packet (NDP) type frame including a Short Training Field (STF) field, a Long Training Field (LTF) field, and a Signal (SIG) field without a Data field, and the data transmission time information is included in the SIG field.

* * * * *